(12) United States Patent
Sanfilippo et al.

(10) Patent No.: US 8,518,337 B2
(45) Date of Patent: Aug. 27, 2013

(54) TUBE-BUNDLE EQUIPMENT FOR PROCESSING CORROSIVE FLUIDS

(75) Inventors: Domenico Sanfilippo, Paullo (IT); Luca Mairano, Milan (IT); Alessandro Gianazza, Legnano (IT); Lino Carlessi, Dalmine (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 13/003,988

(22) PCT Filed: Jul. 13, 2009

(86) PCT No.: PCT/EP2009/005103
§ 371 (c)(1),
(2), (4) Date: Apr. 21, 2011

(87) PCT Pub. No.: WO2010/006757
PCT Pub. Date: Jan. 21, 2010

(65) Prior Publication Data
US 2013/0123536 A1    May 16, 2013

(30) Foreign Application Priority Data
Jul. 17, 2008    (IT) .............................. MI2008A1302

(51) Int. Cl.
*B01J 19/00*    (2006.01)
*F28F 19/00*    (2006.01)

(52) U.S. Cl.
USPC ........... 422/241; 422/240; 422/651; 165/133; 165/134.1; 29/890.053; 29/890.054

(58) Field of Classification Search
USPC ................ 422/241, 240; 165/133, 134.1
See application file for complete search history.

(56) References Cited

U.S. PATENT DOCUMENTS
2006/0032620 A1    2/2006  Gandolfi et al.
2007/0235171 A1 *  10/2007 Romiti .......................... 165/145
2008/0093064 A1    4/2008  Gianazza et al.

FOREIGN PATENT DOCUMENTS
DE    100 06 151    9/2001
EP    1 577 631     9/2005
FR    2 702 271     9/1994

OTHER PUBLICATIONS
U.S. Appl. No. 13/318,793, filed Jan. 12, 2012, Gianazza, et al.
International Search Report issued Oct. 19, 2009 in PCT/EP09/005103 filed Jul. 13, 2009.

* cited by examiner

*Primary Examiner* — Walter D Griffin
*Assistant Examiner* — Lessanework Seifu
(74) *Attorney, Agent, or Firm* — Oblon, Spivak, McClelland, Maier & Neustadt, L.L.P.

(57) ABSTRACT

Tube-bundle equipment for heat exchange operations at high pressures and temperatures, under conditions of high aggressiveness of the process fluids, comprising a titanium lining (11) and a series of tubes (1) consisting of at least one layer of zirconium (2), positioned in contact with said fluids, wherein the tube plate on which said tubes are inserted comprises an outer layer (S) of zirconium or an alloy thereof and an underlying layer (5) of titanium welded to the lining of the equipment. Said equipment is particularly used as a heat exchanger, for example as a stripper, in the high-pressure cycle of urea syntheses processes.

26 Claims, 2 Drawing Sheets

Figure 3:
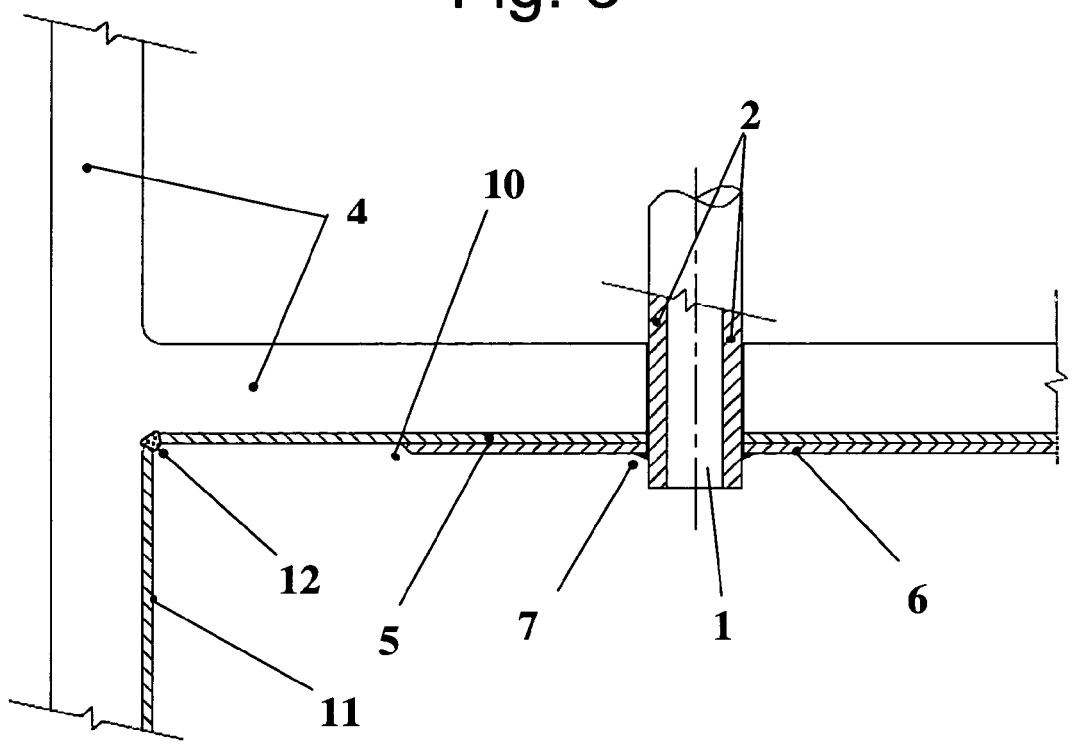

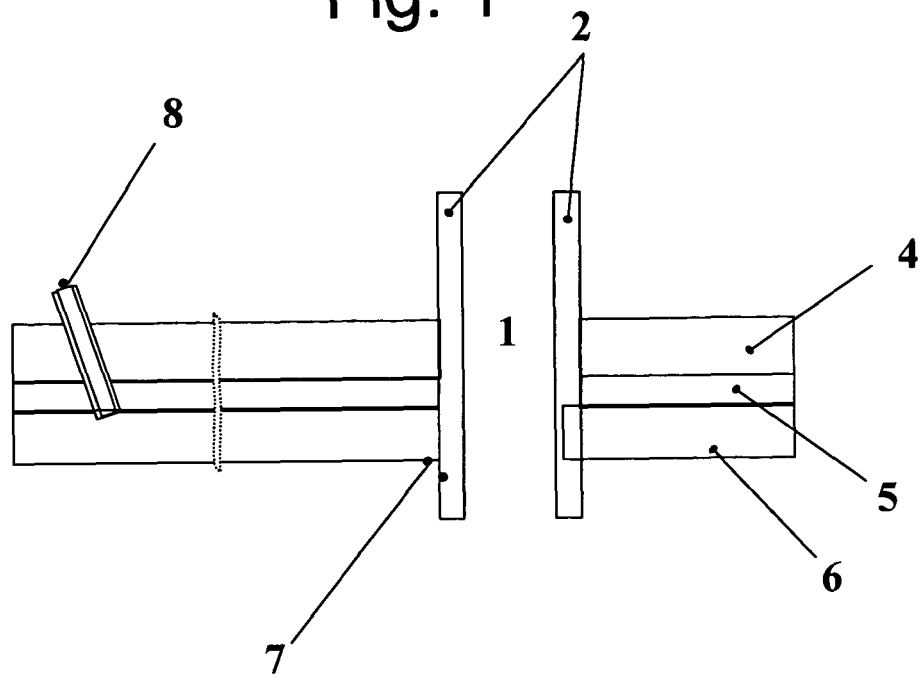
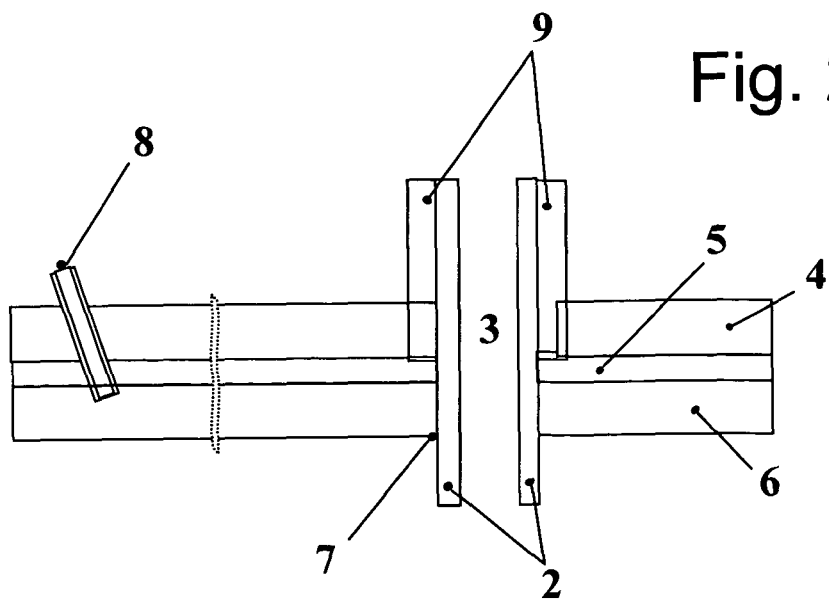

TUBE-BUNDLE EQUIPMENT FOR PROCESSING CORROSIVE FLUIDS

The present invention relates to tube-bundle equipment for processing corrosive fluids and a method for its embodiment.

More specifically, the present invention relates to lined tube-bundle equipment, suitable for processing corrosive fluids at medium or high pressures and temperatures, up to 100 MPa and 400° C. respectively, especially in industrial plants for the production of urea.

The construction technique of high-pressure industrial equipment comprising a specific section or area for thermal exchange between fluids, such as reactors, evaporators, condensers, decomposers and so forth, normally comprises the assembly of a compact pressure-resistant body capable of tolerating the operating pressures, guaranteeing maximum safety and duration with time, provided with the necessary passages for outside communication and inspection and the inlet and outlet of the process fluids. The material which is most widely used for the production of the pressure-resistant body is carbon steel, due to its excellent combination of high mechanical properties, its relatively low cost and commercial availability.

In order to maximize the exchange surface, a tube bundle is normally built up inside the pressure-resistant body, consisting of a set of tubes which can also be quite numerous, whose ends are seal-inserted on a perforated plate or drum (thus called tube plate), facing a fluid collection or distribution chamber. The thermal exchange takes place through the walls of the tubes, between a first fluid circulating therein and a second fluid circulating in a chamber outside the tube bundle. The tube plate, together with the walls of the tubes, must sustain the high pressure differential normally existing between the two fluids, one of which is usually saturated vapour at pressures of 0.5 to 4 MPa.

In processes which generate highly aggressive fluids, at least one of the two surfaces of each tube and tube plate and at least a part of the internal surface of the pressure-resistant body, specifically that of the collection and/or distribution chamber, are exposed to direct contact with a process fluid with characteristics of high aggressiveness. Some of the known methods and equipment generally adopted for effecting heat exchange in these cases are mentioned, for example, in the technical publication "Perry's Chemical Engineering Handbook", McGraw-Hill Book Co., $6^{th}$ Ed. (1984), pages 11-18.

The problem of corrosion has been faced with various solutions in existing industrial plants, and others have been proposed in literature. There are in fact numerous metals and alloys capable of resisting, for sufficiently long periods, the extremely aggressive conditions created inside a synthesis reactor of urea and other equipment in processes involving fluids having an extremely high corrosiveness, such as for example in the synthesis of nitric acid. Among these, lead, titanium, zirconium, niobium and numerous high-performance stainless steels, such as, for example, AISI 316L steel (urea grade), INOX steel 25/22/2 Cr/Ni/Mo, special austeno-ferritic steels, austenitic steels with a low content of ferrite, etc. Equipment of the above type, however, is not economically convenient if entirely constructed with these corrosion-resistant metals or alloys, due to the significant quantity of high-cost materials which would be necessary for the purpose, and also as a result of structural and construction problems due to the necessity of using special welding and bonding methods and, in certain cases, due to the lack, in certain metallic materials, of the excellent mechanical qualities of carbon steel. Resort is normally made to the production of containers or columns made of normal carbon steel, possibly multilayered, having a thickness varying from 20 to 600 mm, depending on the geometry and pressure to be sustained (pressure-resistant body), whose contact surface with the corrosive or erosive fluids is uniformly covered with a lining consisting of a corrosion-resistant metallic material, having a thickness normally ranging from 2 to 30 mm.

The processes for the production of urea normally used in industry, for example, comprise at least one section which operates at high temperatures and pressures (synthesis cycle or loop), at which the process fluids, i.e. water, carbon dioxide, ammonia and especially saline solutions containing ammonium carbamate and/or urea, become particularly aggressive. It is known that normal carbon steel is not capable of resisting the corrosion of these fluids at a high temperature, and when in contact with them, undergoes a progressive and rapid deterioration which weakens its structure until it causes losses towards the outside, or even structural collapse with consequent explosions.

In particular, in the production processes of urea currently in use, the ammonium carbamate (hereafter abbreviated as "carbamate", as used in the specific field) not transformed into urea is decomposed again to ammonia and carbon dioxide in the so-called high-pressure stripper, substantially operating at the same pressure as the reactor and at a slightly higher temperature, which consists of a tube-bundle exchanger positioned vertically, in which the urea solution leaving the reactor and containing non-reacted carbamate and excess ammonia, is passed in a thin film along the internal wall of the tubes, whereas saturated vapour at medium pressure (1-3 MPa) is circulated and condensed, at the corresponding equilibrium temperatures, in the chamber outside the tube-bundle, to supply the energy necessary for the flash of excess ammonia and decomposition of the carbamate. The pressure-resistant body of the stripper is made of normal carbon steel, whereas the tubes of the tube bundle are generally made of a corrosion-resistant material.

The gases leaving the stripper are usually re-condensed in a carbamate condenser, also essentially consisting of a tube-bundle exchanger, which is therefore in contact with a mixture similar to that of the decomposer (except for the urea) and consequently extremely corrosive. Also in this case, the internal lining and tube bundle are made of the above particular stainless materials.

Processes for the production of urea which use the above separation and re-condensation method of carbamate at a high pressure are described for example in the U.S. Pat. Nos. 3,984,469, 4,314,077, 4,137,262, EP 504.966, all assigned to the Applicant. A wide overview of the processes mainly used for the production of urea is also provided in "Encyclopedia of Chemical Technology", $4^a$ Edition (1998), Suppl. Vol., pages 597-621, John Wiley & Sons Pub., to whose contents reference should be made for further details.

In the particular case of a tube-bundle heat exchanger, such as for example a stripper or carbamate condenser included in the synthesis cycle (loop) of urea, the solution to problems of corrosion is extremely complex due to the particular geometry of the equipment which does not allow a controlled and reproducible distribution of the temperatures and compositions of the fluids, especially when the heat exchange is simultaneous with chemical reactions and turbulences which arise in the carbamate decomposition areas. Also in these cases, attempts have been made to prevent corrosion with suitable linings of the surface of the tube plate and other surfaces in contact with the corrosive fluids, with relative but still not satisfactory success.

It is also known that the corrosion-resistance of stainless steels in contact with saline solutions, acid or alkaline, such as those of carbamate in water, is considerably increased if these fluids contain a small quantity of oxygen, introduced as air or other compound capable of generating oxygen, such as ozone or a peroxide. This technology has been widely used and is described, for example in U.S. Pat. No. 2,727,069 (Stamicarbon) and U.S. Pat. No. 4,758,311 (the Applicant). Although representing a considerable improvement, this technical solution, however, still has various drawbacks, due to the greater control necessary for preventing the formation of areas with a concentration of oxygen close to the explosiveness limits, and also because the distribution of oxygen is not uniform, especially in the presence of gas/liquid biphasic systems such as those present in the whole synthesis cycle of urea, and consequently it does not guarantee a satisfactory protection from corrosion in any point of the surface exposed.

Alloys and metals different from stainless steel have already been previously proposed as materials for the construction of reactors and exchangers used for the synthesis of urea. UK 1.046.271 (Allied Chemical Corp.) for example, describes a process for the direct synthesis of urea at 205° C. and 27 MPa in which the reactor is completely made of zirconium. It is evident however that this reactor is difficult to construct and has significant costs.

Reactors for the synthesis of urea made of carbon steel lined with zirconium or titanium are mentioned in the publication "Chemical Engineering" of May 13, 1974, pages 118-124, as an alternative to reactors lined with stainless steel.

The U.S. Pat. No. 4,899,813 (assigned to the Applicant) describes the construction and use of vertical tube-bundle equipment particularly suitable for the high-pressure stripping operation of the solution of urea coming from the synthesis reactor. In order to prevent corrosion in the areas inside the tubes, where the heat exchange and decomposition of the carbamate take place, and consequently where there is the maximum aggressiveness of the fluid, a tube bundle consisting of bimetallic tubes has been used, i.e. consisting of an external part made of stainless steel, and an internal part, relatively fine (0.7-0.9 mm), made of zirconium, adherent to the former, but not welded to it. The remaining part of the exchanger/stripper in contact with the urea solution is, on the other hand, constructed with the normal technique of carbon steel lined with a suitable stainless steel. In this way problems linked to corrosion inside the tubes are solved, due to the excellent resistance of zirconium, without however encountering the difficulties associated with the production of special steel/zirconium joints, which cannot be effectively welded directly to each other, and at the same time keeping the production of the equipment economical.

In spite of the excellent results obtained by applying this latter technology, however, it has been found that in certain areas of the exchanger exposed to more aggressive conditions, especially concentrated on the surface of the tube plate, and close to the zirconium/steel contact surfaces, corrosion phenomena can in any case take place, which contribute to shortening the service cycle of the equipment and causing the stoppage of the process line for the necessary repairs or substitutions. This situation is known in the high-pressure stripper of urea, but it is not excluded that it may also occur, over a long period of time, in other tube-bundle equipment operating under similar conditions of aggressiveness.

A complete lining of said tube equipment with zirconium, or even of the side of the tube plate mostly exposed, on the other hand, has various applicative drawbacks, both in terms of construction, due to the known difficulties of welding zirconium joints, the lack of homogeneity of the welded joints, and incompatibility of Zr in being welded with steels, and also from the point of view of safety, as a possible loss of the protective zirconium layer would lead to direct contact of the corrosive fluid with the carbon steel beneath the lining, rapidly producing structural damage, sometimes even before the loss can be detected through a weep-hole.

Strippers for the decomposition of carbamate, are known in the state of the art, lined with titanium in the sections in direct contact with the process fluid, which facilitate the formation of the lining, at the same time guaranteeing an excellent resistance to corrosion. It has been found however that titanium does not give such satisfactory results in the production of the bundle and tube plate, where it undergoes combined phenomena of erosion and chemical aggression.

The problem of the duration and safety of the pressure equipment exposed to very corrosive fluids has consequently still not been solved in a completely satisfactory way, especially with respect to certain types of tube-bundle equipment used in the synthesis cycle of urea.

During its activity for continuously improving its own technologies, the Applicant has now found that the above problems can be surprisingly overcome by adopting a particular arrangement of protective elements in the construction of tube-bundle heat exchange equipment operating under highly critical conditions. This new approach also allows a reduced quantity of anti-corrosive material to be used for the lining, but at the same time significantly increasing the operating duration of the equipment. A further advantage consists in the simplification of the construction technique for the production of said equipment, thanks to the facilitated use of explosive bonding methods.

A first object of the present invention therefore relates to tube-bundle equipment suitable for heat exchange under high pressure and temperature conditions, between two fluids of which one having characteristics of high aggressiveness towards carbon steels under the process conditions, comprising a hollow body delimited by an outer casing, or pressure-resistant body, suitable for sustaining the operating pressure and consisting of a material subject to corrosion by contact with said highly aggressive fluid, having appropriate openings for the inlet and outlet of fluids, in which there is a collection cavity and a distribution cavity of the highly aggressive fluid, in fluid communication with each other by means of a series of tubes comprising at least one metallic layer of zirconium or an alloy thereof, which form the tube bundle, and an intermediate cavity, comprising said tube bundle, which is separated from the previous ones by means of suitable airtight tube plates, characterized in that at least one of said collection or distribution cavities comprises a lining of the internal wall of titanium or an alloy thereof and is delimited by a tube plate comprising at least the following three metallic layers:

A) a first layer suitable for sustaining the pressure thrust, essentially consisting of a metallic material with high mechanical performances, subject to corrosion if put in contact with said highly aggressive process fluid;

B) an intermediate layer made of a material consisting of titanium or an alloy thereof, situated directly or indirectly on the surface of said layer (A) and welded to the edges with said titanium lining of the cavity;

C) a layer consisting of zirconium or an alloy thereof, having a surface metallurgically bound with the surface of said intermediate layer (B) on the opposite side with respect to the layer (A), and the other surface exposed to contact with said highly corrosive fluid during use, said layer being seal-welded with the zirconium layer of said tubes.

A second object of the present invention relates to a method for the production of said equipment, comprising the preparation of said tube plate with three or more layers, preferably with the use of explosive bonding or welding.

Other objects of the present invention will appear evident for experts in the field in the continuation of the present description and claims.

The term "alloy" as used herein with reference to a certain metal, for example zirconium or titanium, refers to an alloy comprising said metal in a quantity of at least 60% by weight. In the following description, reference to the metal should be intended as also including its alloys, unless otherwise specified.

In accordance with the present description, the term "resistant to corrosion" referring to a material with respect to a fluid under certain process conditions, defines a material which has a corrosion lower than 0.1 mm/year measured according to the regulation ASTM A 262 file C, HUEY TEST, particularly adopted for Ni/Cr/Mo 25/22/2 stainless steel linings. Corrosion indexes for materials of normal industrial use are indicated in various manuals known to experts in the field, such as, for example, in tables 23-22 to 23-24, of the above-mentioned "Perry's Chemical Engineering Handbook", under the item Ammonium Carbamate. A material is typically subject to corrosion if its HUEY TEST index is equal to or greater than 0.5 mm/year.

The term "strength-welding" and "seal-welding", as used in the present description and claims, refer to the following definitions taken from the regulation ASME VIII Div.1 UW20:

a strength-welding is a welding whose stress resistance, on the basis of the project requirements, is equal to or greater than the stress resistance of the parts welded in the application direction of the load;

a seal-welding is effected with the aim of avoiding losses and its dimensions are not determined on the basis of the loads expressed in accordance with the project requirements.

The term "metallurgically bound" and its derivative forms, is used herein with reference to the joining between two metallic surfaces, in which an adhesion and seal are obtained in the same order of magnitude as the cohesive forces of the same metallic materials forming the surfaces. Metallurgically bound surfaces can be obtained with various known methods, among which welding, explosive bonding, hot or cold co-extrusion, and so forth.

The pressure equipment according to the present invention can be used for efficiently effecting heat exchange operations between two single or multiphase fluids, at least one of which has characteristics of high corrosiveness towards normal carbon steels, and moderate corrosiveness, also occasional, towards stainless steels, comprising the high-performance or "urea grade" steels mentioned above. Numerous examples of these steels are mentioned, among the wide range of publications available, in the already mentioned manual "Perry's Chemical Engineering Handbook", from page 23-39 to page 23-41 and especially tables 23-10 to 23-15. Furthermore, this equipment does not require particular expedients such as the introduction of modest quantities of air or another oxidant in the process fluids.

The fluids with a high aggressiveness referred to in the present description can be single-phase, i.e. normally consisting of a liquid or a gas, or multiphase, normally biphasic, consisting of a liquid phase and a vapour phase in equilibrium. Typical fluids of this kind are those present in certain chemical processes, such as, for example, the production of nitric acid, the production of melamine, and in particular fluids circulating in the high- or medium-pressure section of a synthesis plant of urea, such as the aqueous or acqueous/ammonia solutions of ammonium carbamate present in the carbamate decomposer or stripper, downstream of the reactor, in which the urea produced is separated from the non-converted reagents.

The equipment according to the present invention is capable of operating at pressure differentials (between the two fluids and/or towards the outside) normally ranging from 5 to 100 MPa and temperatures ranging from 100 to 400° C. In the particular case of the stripper in the urea production process, the usual operating conditions are a pressure of 12 to 25 MPa and a temperature ranging from 140 to 220° C., in the presence of mixtures containing water, ammonia, carbon dioxide and ammonium carbamate, which is the condensation product of these compounds according to reaction (I):

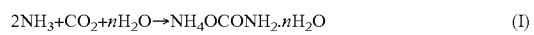

$$2NH_3 + CO_2 + nH_2O \rightarrow NH_4OCONH_2 \cdot nH_2O \quad (I)$$

In industrial plants for the production of urea, to which the present invention preferably refers, the above equipment included in the high or medium pressure sections contains volumes ranging from 2,000 to 100,000 litres.

The pressure equipment according to the present invention can have numerous forms and geometries, both internally and externally, depending on the function for which it is used. It is appropriately made in accordance with the criteria typical of tube-bundle heat exchangers for high pressures. It therefore normally has a cylindrical form with two semispherical caps situated at the ends of the cylinder, for a better distribution of the pressure thrust. Openings for the entry and outlet of fluids, the introduction of possible sensors and an opening for inspections during operating stoppages (manhole) are suitably situated in the semispherical caps, which respectively delimit the distribution and collection cavities, and along the cylindrical body, which delimits the intermediate cavity.

In the more preferred case of the stripper in the urea synthesis cycle, the equipment is vertically oriented and the liquid flow takes place by a downward flow along the internal walls of the tube. In this case, the cavity which is most critical is the lower collection chamber, which is therefore lined with titanium and is delimited by the three-layered tube plate as specified above.

The outer wall of the equipment, which sustains almost all of the pressure thrust, consists of a thick carbon steel casing, also called pressure-resistant body, having a thickness calculated in relation to the pressure to be sustained and normally varying from 20 to 350 mm. In high-pressure exchangers, the outer wall can conveniently have different thicknesses in different areas of the equipment in relation to the pressure to be effectively sustained and form of the equipment. Typically, the central cylindrical area, in contact with the vapour at pressures of 0.2 to 5 MPa, preferably has thicknesses ranging from 20 to 100 mm, whereas the wall of the caps and cylinder close to these, subjected to the pressure of the process fluids, has proportionally greater thicknesses, preferably between 50 and 300 mm. The wall can consist of a single layer or various layers assembled according to the known art.

In the most common embodiment, there are three distinct cavities (or chambers) in the equipment, separated from each other by two tube plates, suitably positioned transversally with respect to the main axis of the equipment, comprising a flat element A consisting of a metal with high characteristics of mechanical resistance, normally having a thickness of 40 to 700 mm, preferably from 100 to 650 mm, suitable for tolerating the difference in pressure existing between adjacent cavities. This element, analogously to the outer wall of the equipment, consists of a single layer or various superimposed layers. Its overall thickness is calculated on the basis of the diameter of the equipment and pressure differential, according to known methods. The materials suitable for obtaining the layer A are selected from metals or alloys capable of tolerating high mechanical stress for long periods, which are commercially available at reasonable costs. The material for forming the layer A is normally selected from carbon steels, which form an excellent compromise between the above criteria. These are typically those normally used in the metallurgical industry as construction material with high mechanical properties such as elasticity, ductility, and hardness (see for example the above-mentioned publication "Perry's Chemical Engineering Handbook", page 23-15). Other suitable materials for forming the layer A, as also the pressure-resistant body of the present equipment, are high-yield steels of the most recent production, such as, for example, grade 4 steels according to the regulation ASME SA 765.

In the more preferred case, the two plates are approximately symmetrically positioned, each close to one of the two caps and define a central volume preferably having a cylindrical geometry. The distance between the two plates in the case of an exchanger having a cylindrical geometry is defined by the length of the tube bundle.

Each plate is force-fixed on the circular wall by connecting and welding the steel layer A on the steel layer of the pressure-resistant body. The bonding and strength-welding methods of the steel walls, whether they consist of one or more layers, are well-known to experts in the field and described in numerous articles.

A series of tubes arranged parellelly to the main axis is fixed between the two plates, which are consequently suitably perforated, so that a first fluid can pass through them between the two cavities situated at the ends. A second fluid is circulated in the intermediate cavity (shell side) to effect heat exchange through the walls of the tubes. This fluid can be vapour or pressurized water, or a second process fluid, possibly also corrosive, in which case it may be necessary to use an anti-corrosive lining on both sides of the tube plate.

Said tubes are in a varying number according to the project specifications, but they normally range from a minimum of 2 to about 10,000 for larger equipment. There are preferably from 100 to 5,000 tubes, and their diameter ranges from 10 to 100 mm. The length of the tubes normally coincides with the length of the central body of the equipment and preferably ranges from 1 to 10 m, their form is generally linear, but tubes comprising curved or toroidal parts are also included. Intermediate diaphragms (also called baffles, according to common terminology) can be positioned in the intermediate cavity to support the tubes and allow a better passage of hot fluid (vapour) during its flow.

According to the present invention, the internal wall of each tube comprises at least one metallic layer made of zirconium or an alloy thereof, whose surface is in contact with the corrosive fluid during the process cycle. In the simplest case, the tube can integrally consist of zirconium or an alloy thereof (single layer), which however can lead to higher costs due to the use of considerable quantities of zirconium. Other constructive solutions for the tubes of the present invention can comprise, for example, the bimetallic tube made of zirconium and stainless steel described in U.S. Pat. No. 4,899,813, consisting of a thin internal layer of zirconium and a thicker layer of urea grade stainless steel. According to other techniques said tube in the tube bundle can comprise at least one layer of titanium and one of zirconium, preferably inserted in each other and metallurgically bound to each other, such as that described for example in international patent application WO 06/020381 or in the copending Italian patent application MI06A 001223.

The thickness of said layer of zirconium or zirconium alloy in the tubes preferably ranges from 0.3 to 20 mm, in particular, from 0.3 to 5 mm, more preferably from 0.4 to 3 mm, if the zirconium layer is in a bimetallic tube made of zirconium and steel or zirconium and titanium, as described above, and from 1 to 20 mm, more preferably from 2 to 5 mm, in the case of a tube entirely made of Zr. The ratio between the thickness of the stainless steel or titanium layer, and the thickness of the layer of Zr lining in the bimetallic tube ranges from 1 to 20, more preferably from 2 to 8.

Various grades of zirconium and relative alloys are available on the market, all suitable for the embodiment of the present invention. Grades from 50 to 70 according to ASME SA516 are particularly suitable for the embodiment of the equipment for the treatment of process fluids in the synthesis of urea and nitric acid. Zirconium alloys suitable for the purpose are, for example, the various grades of Zyrcaloy. References to zirconium and its alloys are also mentioned in the above-mentioned "Perry's Chemical Engineering Handbook", page 23-50, table 23-19. Grades of zirconium and its alloys with a low oxygen content are even more preferred.

In the functioning, at least one of the cavities into which the interior of the equipment is divided in accordance with the present invention, is in contact with a fluid having characteristics of high aggressiveness under the pressure and temperature conditions which are established in the interior. The inner surface of said cavity is lined with titanium or one of its suitable alloys, according to the known art, obtaining a long-lasting and resistant structure. The thickness of the titanium lining is established by the expert in the field on the basis of the corrosiveness data under the operating conditions of the equipment. It is preferably selected from 1 to 20 mm, more preferably from 2 to 10 mm.

A second laminar layer B consisting of titanium or an alloy thereof, preferably titanium, is situated on the surface of the layer A of the tube plate which delimits the cavity. Said layer B is joined by seal-welding to the corresponding titanium lining of the cavity. The thickness of the layer B preferably ranges from 1 to 20 mm, more preferably from 3 to 15 mm. Especially when the tube plate is produced using the explosive bonding technique, the thickness of the layer B can also vary by a few millimeters from point to point. If the tube bundle consists of Ti/Zr bimetallic tubes, an expert in the field can also effect a welding, if necessary, between said layer B and the titanium layer of each tube.

The third layer C of the tube plate is arranged on said layer B, so that the surfaces of the two layers in reciprocal contact are metallurgically bound to each other. As previously specified, it consists of zirconium or an alloy thereof, preferably zirconium or an alloy thereof containing at least 90% by weight of zirconium, more preferably pure zirconium. Said layer C forms an internal coating or lining of the tube plate, destined for direct contact with the process fluid with aggressive properties.

It has a suitable thickness for sustaining mechanical and thermal stress for long periods during use: a thickness preferably ranging from 0.5 to 20 mm, more preferably from 3 to 15 mm. The thickness of the layer C, like that of the layers A and B, can also have different values in different areas of the tube plate, in relation to the density and form of the tubes, the technical requirements emerging during the construction of the equipment and the characteristics of the fluid in contact with them.

In accordance with the present invention, the layer C extends over the whole useful surface of the tube plate, with the exception of the openings for the passage of the tubes, to which it is seal-welded on the layer consisting of zirconium. In the peripheral area of the tube plate, however, close to the seal joint between the layer B and the titanium, or an alloy thereof, lining of the remaining walls of the cavity, the layer C is interrupted without requiring particular expedients, as the metallurgical bond with the underlying layer B is sufficient for ensuring the sealing and avoiding infiltrations. According to the present invention, said layer C preferably extends over the tube plate up to a distance of at least 30 mm, more preferably at least 50 mm, from the wall (of the cavity) on which the plate itself is force-welded.

For an optimum embodiment of the present equipment, it is also preferable for the outer border of said layer C to be positioned at a distance of at least 10 mm, more preferably at least 30 mm, from the outer wall of the closest peripheral tubes of the tube bundle.

The layer B and the layer C consist of metallic materials which are known to be compatible with the reciprocal seam, for example by means of the known techniques for the welding of zirconium with titanium, which envisage various expedients, among which the use of an inert atmosphere. It has been found, however, that a welding of the traditional type between two layers is not necessary for reaching the desired resistance performances and reliability, as the formation of a bond of the metallurgical type, which can also be obtained with techniques different from welding, such as explosive bonding or by electrochemical deposit, is sufficient.

In the tube plate, the layer C is seal-welded with the zirconium layer of each tube, in order to prevent infiltration and contact of the process fluid with the underlying layers B and A. Suitable techniques for this welding are generally known and available to experts in the field. According to a particular embodiment of the present invention, and especially if the tubes are entirely made of zirconium, the welding of the layer C is effected on the outer surface, leaving a section of tube protruding to favour the insertion of ferrules or other elements suitable for regulating the dripping of the liquid into the exchangers positioned vertically, as in the case of the stripper in urea production plants. If the tube bundle comprises bimetallic tubes, the welding is normally effected on the internal layer, consisting of zirconium, after removal of the terminal part of the outer layer (for example made of steel or titanium) for a length corresponding to at least the thickness of the layer C, preferably greater, to allow, as with the previous case, a section of zirconium tube to protrude for a few centimetres. If the tubes are of the bimetallic type, made of zirconium on titanium, the titanium layer can also be conveniently welded to both the zirconium layer C and the titanium layer B.

According to an embodiment of the present invention, between said layer A and said layer B there can be one or more layers of another metallic material, for example stainless steel selected from those previously mentioned, extended over the whole tube plate or only on one or more parts of it. These additional layers can form, according to the construction techniques adopted, a further safety layer against the possible loss of corrosive fluid, or they can be inserted to support the parts of the tubes consisting of stainless steel, or as a support in the area where there is a weep-hole. In these cases, the layer B is arranged indirectly on the layer A.

The use of the plate with at least three layers in the equipment according to the present invention surprisingly allows the drawbacks mentioned above to be overcome.

According to a preferred aspect of the present invention, in certain points of the wall of the pressure-resistant body which delimits each cavity in contact with the corrosive fluid, there are small-sized holes, called weep-holes, whose function is to reveal possible losses of the internal lining before the carbon steel of the layer A undergoes significant damage due to corrosion. A weep-hole, according to the known art, normally consists of a small tube having a diameter of 8-15 mm, generally made of stainless steel, titanium or another material resistant to corrosion, which is inserted into the carbon steel layer until it reaches the surface beneath the anti-corrosive lining (or one of its layers in the case of a multilayer lining). If there is a loss in the lining due to the high pressure, the internal corrosive fluid immediately diffuses in the underlying interstitial area and, if not detected, causes rapid corrosion of the carbon steel of which the pressure-resistant body or tube plate is formed. The presence of weep-holes enables these losses to be detected. For this purpose, all the interstitial areas beneath the anti-corrosive lining are normally put in communication with at least one weep-hole. The number of weep-holes generally ranges from 2 to 4 for each ferrule in the cylindrical body. The weep-holes are inserted in the caps and tube plate according to consolidated praxes well-known to experts in the field.

A second aspect of the present invention relates to a method for the production of the above tube-bundle equipment with improved performances.

In accordance with this, a further object of the present invention relates to a method for the production of the tube-bundle equipment according to the present invention, comprising the following steps in succession for the preparation of said tube plate:

i) preparation of a layer A made of steel, preferably carbon steel, suitable for sustaining the pressure thrust of the process fluid;

ii) formation of an intermediate layer B made of titanium, situated on the side of said layer A exposed to contact with said aggressive fluid;

iii) arrangement of an anti-corrosive layer C made of zirconium, on the surface of said layer B, on the side opposite to said layer A with the formation of a metallurgical bond between the surfaces of the layers B and C;

characterized in that said layer B is seal-welded with the titanium lining of the cavity delimited by said tube plate and said layer C is at least seal-welded with said zirconium layer or an alloy thereof of each tube of the tube bundle.

In accordance with the method of the present invention, the multilayered tube plate can be prepared independently of the casing (shell) of the tube-bundle equipment and subsequently fixed to the latter, in the desired position, by means of strength-welding of the respective steel parts and seal-welding of the respective titanium linings and layers.

In step (i) of the present method, a layer A made of carbon steel is prepared, of suitable size, preferably having a thickness ranging from 40 to 700 mm, preferably from 100 to 650 mm, and a diameter ranging from 500 to 4,000 mm, so as to be transversally inserted and welded in the volume of the tube bundle equipment. Said layer A can also consist of various steel layers, joined according to the usual manufacturing techniques, in order to improve its elasticity and pressure resistance.

In the following step (ii), a relatively thin layer B of titanium or an alloy thereof is laid on a surface of the layer A. Due to the welding incompatibility of the two layers, the layer B is fixed with mechanical joining techniques (including explosive bonding) or by means of puncturing. In accordance with the present invention, said layer B, in addition to forming a further protective lining, has the function of forming a ductile and compatible support for the subsequent layer C made of zirconium, which allows a better adaptation to the geometry of the tube plate. The layer B preferably has a thickness ranging from 1 to 20 mm.

According to a particular aspect, in step (ii), said layer B can be arranged in direct contact with the surface of the layer A, or, according to the present invention, one or more other intermediate layers, for example made of stainless steel, can be interposed between the layer A and the layer B, and fixed on the layer A according to the usual joining and welding techniques.

The formation of the metallurgical bond according to step (iii) can be obtained with various methods, known to experts in the field, among which are preferred in this case explosive bonding or friction techniques or those by means of electrochemical deposit or metal spraying. These methods are preferred as they are simpler and more effective with respect to the usual welding techniques (although the latter can in any case be used in accordance with the present invention) for joining titanium and zirconium, as they do not require the use of an inert atmosphere and ensure the formation of a homogeneous metallurgical bond on the whole contact surface of the two metallic layers.

In particular, a preferred embodiment of the three-layered structure of the plate according to the method claimed herein, is effected with the "explosion" technique, which allows a stable metallurgical bond to be obtained, with relative simplicity, with the underlying layer B made of titanium. Furthermore, the application of this technique produces a particular adherence between the titanium and steel of the respective contact surfaces of the layers B and A, thus obtaining a particularly compact and resistant tube plate, suitable for the subsequent processing necessary for the insertion of the tube bundle.

In accordance with this technique, the laminar elements respectively forming the layers A, B and C, after adequate cleaning of the surfaces, are superimposed in vertical sequence, maintaining the distance between them almost constant, possibly by means of calibrated spacers. On one side of the structure thus obtained, above the layer C, an explosive charge is positioned and detonated so that the impact wave which is produced propagates uniformly towards the opposite side. The extremely high pressure between the zirconium/titanium and titanium/steel surfaces causes the partial interpenetration of the surface molecular layers and the propagation of the thrust from one side to the other allows the expulsion of every residual air-bubble and possible oxide residues, resulting in a seal adhesion analogous to that of a welding.

A more detailed description of this technique applied to the construction of tube plates is provided, for example, in "Proceedings of Corrosion Solutions Conference", September 2001, pages 119-127.

Once the three layers A, B and C (and the possible intermediate layers) have been positioned, according to the present invention, forming the essential structure of the tube plate, according to the project characteristics and to what is described and claimed, a technician can proceed with the subsequent processing steps analogously to what is already known in the art, for inserting the tube plate inside the equipment, if the previous construction phases have been effected externally, and the insertion of the tubes of the tube bundle. For this purpose, according to a preferred method, the plate is perforated to obtain a series of cylindrical cavities, in a suitable number and with appropriate dimensions for the insertion of the tubes and subsequently inserted in the cylindrical body of the equipment and force-welded on the walls of the pressure-resistant body. The tubes of the tube bundle are then inserted, the zirconium layer of each of them being welded with the layer C of the tube plate, and effecting the possible weldings of the other metallic layers in the case of multilayer tubes. Close to the edge of the tube plate, the layer B made of titanium is also seal-welded with the titanium lining of the remaining walls of the cavity.

All of the above operations are effected in accordance with the standard techniques for the processing and welding of particular metals such as Ti and Zr, which require the use of an inert atmosphere, preferably with argon protection. The order in which they are described is not necessarily an indication of the time order in which they are effected.

A further object of the present invention relates to a heat exchange process between two fluids, of which at least one has a high aggressiveness towards normal carbon steel, under the process conditions specified above, characterized in that said process is carried out in the tube-bundle equipment of the present invention.

A particular example of the equipment according to the present invention, relating to a high-pressure stripper of a plant for the production of urea, is now further illustrated with reference to the drawings provided in the enclosed figures, without, however, limiting or restricting the overall scope of the invention itself.

FIG. 1 schematically represents a section of the tube plate of a high-pressure stripper used for the decomposition of the carbamate of a urea synthesis plant, comprising the welding area of a tube totally made of zirconium.

FIG. 2 schematically represents a section analogous to the previous one, relating however to the welding area of a zirconium-stainless steel bimetallic tube.

FIG. 3 schematically represents a detail of the joining area between the three-layered tube plate and the wall of a stripper built according to the present invention.

For greater simplicity and figurative clarity of the details, the figures show only one tube of the tube bundle and the dimensions are not proportional to the actual dimensions. Corresponding details in the various figures are indicated with the same numbering.

FIG. 1 schematically represents an area in the section of a tube plate according to the present invention, in which a tube 1 is inserted, integrally consisting of zirconium walls 2. The element 4 can be distinguished, not in scale, which forms the layer A made of carbon steel, having a greater thickness, normally 100-500 mm, the section in titanium 5, which forms the layer B, on whose surface the lining 6 consisting of a thin layer C of zirconium, rests. The section represented herein is that of the tube plate positioned in the lower wall of the stripper, where the temperature of the corrosive fluids consisting of a mixture of the aqueous solution of carbamate and urea and relative ammonia and carbon dioxide vapours formed by the decomposition of the carbamate, is higher.

The layer 4 in this case coincides with the body of the tube plate and is dimensioned so as to sustain the stress due to the difference in pressure between the lower collection chamber of the urea solution, and the cylindrical chamber which includes the tube bundle, where the medium or high-pressure saturated vapour condenses. This pressure, for normal urea production processes, ranges from 14 to 22 MPa, preferably 15-20 MPa, corresponding to a temperature ranging from 190 to 210° C.

On the side of the layer 4 facing the collection chamber there is a titanium laminar layer 5 which forms the layer B according to the present invention. This has a thickness of about 10 mm. The laminar layer 5 can consist of a single sheet, or various laminar elements having a suitable thickness, welded to each other and preferably adhering to the underlying layer 4.

The layer 6 made of zirconium (layer C) having a thickness preferably ranging from 8 to 10 mm, is metallurgically bound onto the layer 5. In correspondence with the insertion point of each zirconium tube 1, the layer 6 is welded to the wall 2 of the tube along the circular joining line 7. The welding is effected with the shielding technique with inert gas, as previously described. In this specific case, the welding between the layer 6 of the plate and the zirconium tube is particularly important as it forms the fixing line of the tube and must sustain the pressure differential of about 13 MPa with respect to the intermediate chamber where the vapour circulates. This welding is consequently both a force and seal-welding.

According to a particular aspect of the present invention, a certain number of weep-holes (schematically indicated with the reference number 8 in FIG. 1) are produced through the layer 4 (layer A) in the tube plate, normally in the area situated towards the outer wall of the stripper (schematically positioned, in FIG. 1, after the dashed line). Said weep-holes, whose role is indicated above, are made according to any of the various techniques normally used and are internally lined with stainless steel or also possibly with titanium. Analogous weep-holes, not represented in the figure, are situated in the pressure-resistant body of the cavity, as far as the underlying surface of the lining layer of titanium.

According to the detail represented in FIG. 2, a second embodiment of the present invention comprises the production of a stripper for the decomposition of the ammonium carbamate not converted to urea, using bimetallic tubes 3 consisting of an outer tubular element 9 made of stainless steel, in this case CrNiMo 25/22/2 steel, urea grade, and an internal zirconium lining, with adhesion of the surfaces achieved mechanically. The structure of the three-layered tube plate is substantially analogous to that described above with reference to FIG. 1. Close to the cross-point and mouth of each tube 3 of the tube bundle, the steel layer 4 is force-welded with the outer layer 9 of the tube, in order to sustain the pressure and consequent longitudinal stress which acts on the bimetallic tube.

The layer 6 forming the zirconium layer C, having a thickness of 2 to 3 mm is metallurgically bound on the surface of the layer 5 opposite to the pressure-resistant body 4. Also in this case, adhesion between the two layers by means of the explosive cladding technique, or also by thermal spraying, is preferable.

Close to the mouth of each bimetallic tube 3, said layer 6 is joined directly with the internal lining 2 of the tube by means of seal-welding 7, arranged circularly around the hole of the mouth. A section of the lining 7 is preferably extended by a few centimeters beyond the layer 6 to favour the dripping of the liquid.

In the section represented in FIG. 3, the same elements previously described with reference to FIG. 1 can be essentially distinguished, with respect to form and positioning of the zirconium tube, whereas the detail of the joining area of the tube plate with the outer wall of the stripper is additionally represented, consisting of the thick steel layer 4, forming the pressure-resistant body, and the layer of titanium lining 11, having characteristics analogous to the intermediate layer 5 of the tube plate, to which it is connected by means of a welding line in the point 12, but with a thickness preferably ranging from 5 to 15 mm. The zirconium layer 6 ends close to the joining line of the horizontal tube plate with the vertical wall of the equipment, at a distance conveniently selected from 30 to 40 mm, represented in FIG. 3 by point 10. The border of the layer can be possibly mechanically processed to make it more uniform, or it can terminate with a welding with the underlying titanium layer 5. The distance where the layer 6 is interrupted, is not particularly important for the purposes of the present invention, but it should be suitably selected so as to leave a sufficiently extensive overlapping area between the surfaces of the respective layers of zirconium (6) and titanium (5), metallurgically bound to each other, before the insertion point of the closest tube 1 of the tube bundle. The margin represented by point 10 is preferably positioned at least 50 mm from the nearest tube, even more preferably at least 70 mm. The application of this specification to all the tubes allows a technician to define the dimensions and geometry with which the zirconium layer C according to the invention is arranged on the surface of the tube plate.

In accordance with what is specified above, the present invention, as claimed herein, provides tube-bundle equipment suitable for heat exchange which combines in an original structure, excellent resistance to conditions of high corrosion and erosion of zirconium, with a greater processing facility and availability of titanium, also proposing a simplified design and construction method with respect to the equipment so far known in the art. This result is particularly obtained by originally and surprisingly combining the three-layered structure A, B and C of the tube plate with the titanium lining of the cap and walls adjacent to the plate itself. It is thus possible to effect zirconium/zirconium weldings for the sealing of the tubes, and titanium/titanium weldings for the joining of the protective lining, without resorting to weldings between different metals in the more critical areas due to the attack of aggressive fluids, in particular close to the insertions of each tube in the plate and to the joining area of the tube plate with the wall of the exchanger.

Other embodiments of the present invention, different from those specifically described above, are possible, however, and merely represent obvious variants in any case included in the scope of the following claims.

The invention claimed is:

1. A tube-bundle equipment comprising a hollow body delimited by an outer casing, wherein the hollow body comprises a collection cavity, a distribution cavity, and an intermediate cavity, and wherein airtight tube plates separate the collection cavity from the intermediate cavity, and the intermediate cavity from the distribution cavity, wherein the intermediate cavity comprises a tube bundle comprising 100 to 10,000 tubes having a diameter ranging from 10 to 100 mm, each of which tubes comprises at least one metallic layer of zirconium or an alloy thereof;

wherein the collection cavity and the distribution cavity are in fluid communication with each other through the tubes of the tube bundle, wherein the outer casing consists of a material subject to corrosion if contacted by a fluid that is aggressive toward a carbon steel, wherein an internal wall of the collection cavity, the distribution cavity, or both cavities, comprises a lining of titanium or an alloy thereof, and wherein each tube plate comprises A) a first layer selected from the group consisting of a carbon steel and a high-yield steel, having a thickness of from 40 to 700 mm and a diameter ranging from 500 to 4000 mm with high mechanical performance, wherein the first layer A is subject to corrosion if contacted by a fluid that is aggressive toward a carbon steel, B) an intermediate layer comprising a material consisting of titanium or an alloy thereof, situated on the surface of said layer A and welded with said titanium lining of the cavity, and C) a layer consisting of zirconium or an alloy thereof, having a surface metallurgically bound with the surface of said intermediate layer B on the opposite side with respect to the layer A, said layer C being seal-welded with the zirconium layer of said tubes, and said layer C extending over the tube plate to a distance of at least 30 mm from the internal wall of the cavity, and the outer border of said layer C is situated at a distance of at least 10 mm from the outer wall of the closest tube of the tube bundle.

2. The equipment according to claim 1, wherein, when the equipment is positioned vertically, the collection cavity is situated in the lower part of the equipment.

3. The equipment according to claim 1, wherein said layer A has a thickness ranging from 100 to 650 mm.

4. The equipment according to claim 3, wherein said layer A consists of a carbon steel.

5. The equipment according to claim 1, wherein said layer B has a thickness ranging from 1 to 20 mm.

6. The equipment according to claim 1, wherein said layer C has a thickness ranging from 0.5 to 20 mm.

7. The equipment according to claim 1, wherein said lining of the internal wall of the collection cavity has a thickness ranging from 1 to 20 mm.

8. The equipment according to claim 1, wherein the zirconium layer in each tube of said tube bundle has a thickness ranging from 0.3 to 20 mm.

9. The equipment according to claim 1, wherein each tube of said tube bundle is a bimetallic tube comprising at least one outer layer consisting of stainless steel or titanium, and an internal lining layer consisting of zirconium or an alloy thereof, having a thickness of 0.3 to 5 mm.

10. The equipment according to claim 9, wherein the ratio between the thickness of said stainless steel or titanium outer layer and the thickness of said lining internal layer ranges from 1 to 20.

11. The equipment according to claim 10, wherein said outer layer of the bimetallic tube has a thickness of 2 to 15 mm, and said internal layer of the bimetallic tube has a thickness of 0.4 to 3 mm.

12. The equipment according to claim 9, wherein said bimetallic tube has an internal layer of zirconium which is seal-welded to said layer C and an outer layer of titanium is force- and/or seal-welded to said layer B.

13. The equipment according to claim 1, wherein each tube of said tube bundle consists entirely of zirconium or an alloy thereof.

14. The equipment according to claim 13, wherein the thickness of said tube of the tube bundle ranges from 1 to 20 mm.

15. The equipment according to claim 13, wherein said layer C has a thickness ranging from 3 to 15 mm and is force- and seal-welded with each of said zirconium tubes.

16. The equipment according to claim 1, wherein said layer C extends over the tube plate to a distance of at least 50 mm from the internal wall of the cavity.

17. The equipment according to claim 1, wherein the outer border of said layer C is situated at a distance of at least 30 mm from the outer wall of the closest tube of the tube bundle.

18. A method of synthesizing urea, the method comprising combining precursors of urea with the equipment according to claim 1.

19. The method according to claim 18, wherein the synthesis of urea comprises a high-pressure synthesis cycle of urea.

20. A method for producing the tube-bundle equipment according to claim 1, comprising:
   i) preparing the layer A comprising a steel;
   ii) forming the intermediate layer B comprising titanium situated on said layer A;
   iii) providing the layer C comprising zirconium on the surface of said layer B and on the side opposite side of said layer A, with the formation of a metallurgical bond between the surfaces of the layers B and C;
   wherein
   said layer B is seal-welded with the titanium lining of the collection cavity delimited by said tube plate,
   said layer C is at least seal-welded with said zirconium layer of each tube of the tube bundle,
   said layer C extends over the tube plate to a distance of at least 30 mm from the internal wall of the cavity, and
   the outer border of said layer C is situated at a distance of at least 10 mm from the outer wall of the closest tube of the tube bundle.

21. The method according to claim 20, wherein said metallurgical bond is obtained with a bonding or welding method selected from the group consisting of explosion and metal spraying.

22. The method according to claim 20, wherein the layer C has a thickness ranging from 3 to 20 mm and the layer C is positioned and bound to said layer B by an explosive bonding method.

23. The method according to claim 20, said tube bundle consisting of a plurality of bimetallic tubes, each tube comprising at least one stainless steel outer layer and an internal lining layer of zirconium or an alloy thereof, wherein said layer A is force- and seal-welded with the stainless steel outer layer of each bimetallic tube and said layer C is seal-welded with said internal lining layer.

24. The method according to claim 20, wherein said layer C is force-welded with each tube of said tube bundle.

25. A heat exchange process between two kinds of fluids, at least one of which being a corrosive fluid having a pressure ranging from 5 to 100 MPa and a temperature ranging from 100 to 400° C., and a high degree of aggressiveness towards normal carbon steel under said conditions, wherein the process is carried out in the equipment according to claim 1.

26. The process according to claim 25, wherein the process consists of a stripping operation in a urea production process, and wherein said corrosive fluid is a mixture comprising water, ammonia, carbon dioxide and ammonium carbamate at a pressure ranging from 12 to 25 MPa and a temperature ranging from 140 to 220° C.

* * * * *